US012212695B2

(12) United States Patent
Davis et al.

(10) Patent No.: US 12,212,695 B2
(45) Date of Patent: Jan. 28, 2025

(54) BLOCKCHAIN-BASED SYSTEMS AND METHOD FOR PROVIDING SECURE DIGITAL IDENTITIES AND AFFILIATIONS FOR USERS VIA DIGITAL TOKENS

(71) Applicant: CBOE EXCHANGE, INC., Chicago, IL (US)

(72) Inventors: Glenton Davis, Chicago, IL (US); Joseph Green, Chicago, IL (US); Adam Kelly, Chicago, IL (US); Chris Schneider, Chicago, IL (US)

(73) Assignee: CBOE EXCHANGE, INC., Chicago, IL (US)

( * ) Notice: Subject to any disclaimer, the term of this patent is extended or adjusted under 35 U.S.C. 154(b) by 0 days.

(21) Appl. No.: 17/748,591

(22) Filed: May 19, 2022

(65) Prior Publication Data
US 2023/0379179 A1 Nov. 23, 2023

(51) Int. Cl.
*H04L 9/40* (2022.01)
*H04L 9/00* (2022.01)
*H04L 9/32* (2006.01)

(52) U.S. Cl.
CPC .............. *H04L 9/50* (2022.05); *H04L 9/3213* (2013.01); *H04L 9/3247* (2013.01)

(58) Field of Classification Search
CPC ........ H04L 9/50; H04L 9/3213; H04L 9/3247
USPC ....................................................... 713/189
See application file for complete search history.

(56) References Cited

U.S. PATENT DOCUMENTS

| | | | |
|---|---|---|---|
| 5,752,041 A * | 5/1998 | Fosdick | G06F 21/105 709/225 |
| 7,702,794 B1 * | 4/2010 | Hall | H04L 63/0807 709/227 |
| 8,225,089 B2 * | 7/2012 | Wang | G07F 19/20 713/168 |
| 9,887,996 B1 * | 2/2018 | Clausen | H04L 63/0861 |
| 11,334,876 B2 * | 5/2022 | Yantis | G06Q 20/387 |
| 11,374,754 B2 * | 6/2022 | Wang | H04L 9/006 |
| 2015/0356560 A1 * | 12/2015 | Shastry | G06Q 20/405 705/64 |
| 2017/0200151 A1 * | 7/2017 | Bruno | H04W 12/068 |
| 2018/0198617 A1 * | 7/2018 | Drouin | H04L 9/3213 |
| 2019/0172026 A1 * | 6/2019 | Vessenes | G06Q 20/065 |
| 2019/0333030 A1 * | 10/2019 | Ramasamy | G06Q 20/3674 |
| 2019/0333054 A1 * | 10/2019 | Cona | H04W 12/06 |
| 2019/0354945 A1 * | 11/2019 | Mahajan | G06Q 20/065 |
| 2021/0110147 A1 * | 4/2021 | Tsai | G06V 10/25 |
| 2021/0118085 A1 * | 4/2021 | Bushnell | H04L 9/50 |
| 2021/0182915 A1 * | 6/2021 | Blaikie, III | G06Q 30/0276 |

(Continued)

*Primary Examiner* — Dant B Shaifer Harriman
(74) *Attorney, Agent, or Firm* — MARSHALL, GERSTEIN & BORUN LLP (57) ABSTRACT

Blockchain-based systems and methods for providing secure digital identities and affiliations for users via digital tokens. A set of digital tokens are generated that are sharable on a distributed computer network. The set of digital tokens are affiliated with an entity or a person. One or more of the digital tokens are provided to one or more users of the distributed computer network, where the one or more users comprise at least a first user, and where the first user is provided a first token selected from the one or more of the digital tokens. The first user is identified as affiliated with the entity or the person based on a receipt of an indication that the first user is associated with the first token.

24 Claims, 5 Drawing Sheets

(56) References Cited

U.S. PATENT DOCUMENTS

2021/0326855 A1\* 10/2021 Yantis .............. G06Q 20/38215
2022/0300952 A1\* 9/2022 Senter ................ G06Q 20/3829
2023/0045080 A1\* 2/2023 Marks ....................... H04L 9/50
2023/0071800 A1\* 3/2023 Bradley ............. G06Q 20/3672

\* cited by examiner

BLOCKCHAIN-BASED SYSTEMS AND METHOD FOR PROVIDING SECURE DIGITAL IDENTITIES AND AFFILIATIONS FOR USERS VIA DIGITAL TOKENS

FIELD

The present disclosure generally relates to blockchain-based systems and methods, and more particularly to blockchain-based systems and methods for providing secure digital identities and affiliations for users via digital tokens.

BACKGROUND

Modern computer communications, such as Internet based communications, typically involve various platforms and servers in communication with each other. Such platforms and servers typically comprise their own internal networks, subnetworks, or other computer networks and resources that share information and content, all of which must be stored and protected, typically by propriety systems operated by different centralized owners. User information, such as username, password, social security, or other user information, is typically redundantly stored across each of these proprietary systems. Such redundant storage and access results in digital waste, including over-utilization of network bandwidth and the creation of needless digital network traffic. It also creates frustration on the part of end-users whose devices must store redundant user information (e.g., user identifying information, such as usernames and passwords) in order to interface with each of the redundant systems.

In addition, security of such information is typically low such that if one of these systems is compromised, e.g., by a cyberattack, then usually the user's information is stolen and can be used, at least in part, to access a second or different system. For example, such information can often be reused to hack or attack a second system, where the user may have a same or similar password or other security protocol. This can be especially problematic given that online platforms are typically controlled, hosted, or otherwise maintained by separate entities that do not share information with one another, where each system is under the centralized control of different entities.

For the foregoing reasons, there is a need for blockchain-based systems and methods for providing secure digital identities and affiliations for users via digital tokens, as further described herein.

SUMMARY

The blockchain-based systems and methods provide improved distribution, identification, and authentication of users on a computer network by providing secure digital identities and affiliations for users via digital tokens. For example, online digital identities, as implemented by use of digital tokens on a blockchain, can provide a single source of user authentication for a given user and reduce digital waste across networks. Such digital identities may be used in a variety of ways to identify respective users.

For example, in some aspects, digital tokens may be associated with users where such digital tokens may be used to provide respective digital identities to authenticate a select group users (e.g., fans) for the purpose transacting with, or associating users with, people (e.g., musicians) or entities (e.g., sports teams). Such digital tokens may provide access or privileges in either real-world or virtual environments, such as sporting events, concerts, in videogames, or in the Metaverse. In various aspects, a user's digital token(s), and/or related public and private keys, may be used to identify and/or authenticate a user and server as a single source of authenticity and identification to a variety of entities, persons, and related systems.

More specifically, as described herein a blockchain-based method is disclosed for providing secure digital identities and affiliations for users via digital tokens. In various aspects, the blockchain-based method may comprise generating, by one or more processors, a set of digital tokens sharable on a distributed computer network. The blockchain-based method may further comprise affiliating, by the one or more processors, the set of digital tokens with an entity (e.g., such as a person or a company). The blockchain-based method may further comprise providing, by the one or more processors, one or more of the digital tokens to one or more users of the distributed computer network. The one or more users may comprise at least a first user, where the first user is provided a first token selected from the one or more of the digital tokens. The blockchain-based method may further comprise identifying, by the one or more processors, the first user as affiliated with the entity or the person based on a receipt of an indication that the first user is associated with the first token.

In addition, as described herein, a blockchain-based system is disclosed. The blockchain-based system is configured to provide secure digital identities and affiliations for users via digital tokens. In various aspects, the blockchain-based system may comprise a server comprising one or more processors and one or more memories. The blockchain-based system may further comprise computing instructions configured to be executed on the one or more processors. The computing instructions, when executed by one or more processors, may cause the one or more processors to generate a set of digital tokens sharable on a distributed computer network. The computing instructions, when executed by one or more processors, may further cause the one or more processors to affiliate the set of digital tokens with an entity (e.g., such as a person or a company). The computing instructions, when executed by one or more processors, may further cause the one or more processors to provide one or more of the digital tokens to one or more users of the distributed computer network. The one or more users may comprise at least a first user, where the first user is provided a first token selected from the one or more of the digital tokens. The computing instructions, when executed by one or more processors, may further cause the one or more processors to identify the first user as affiliated with the entity or the person based on a receipt of an indication that the first user is associated with the first token.

Further, as described herein, a tangible, non-transitory computer-readable medium storing instructions for providing secure digital identities and affiliations for users via digital tokens is disclosed. The instructions, when executed by one or more processors, may cause the one or more processors to generate a set of digital tokens sharable on a distributed computer network. The instructions, when executed by one or more processors, may further cause the one or more processors to affiliate the set of digital tokens with an entity (e.g., such as a person or a company). The instructions, when executed by one or more processors, may further cause the one or more processors to provide one or more of the digital tokens to one or more users of the distributed computer network. The one or more users may comprise at least a first user, wherein the first user is provided a first token selected from the one or more of the digital tokens. The instructions, when executed by one or more processors, may further cause the one or more processors to identify the first user as affiliated with the entity or the person based on a receipt of an indication that the first user is associated with the first token.

In accordance with the above, and with the disclosure herein, the present disclosure includes improvements in computer functionality or improvements to other technologies at least because the disclosure describes that, e.g., computing devices are able to reduce storage of user information by use of digital tokens as a single, or limited, storage source of user identity on a blockchain-based computer network. For example, the digital tokens may be used in place of redundant storage of user identification and/or authentication information as would otherwise be stored by redundant and different centralized systems. That is, by reduction of user information across disparate servers, the blockchain-based systems and methods herein reduce storage of redundant user information across digital networks and platforms. This also results in less compute power and memory use by nodes of the system by not having to process and/or store redundant information. Therefore, computing resources are improved by reducing off-chain data storage and memory usage regarding user information.

In addition the blockchain-based systems and methods include improvements in computer functionality or improvements to other technologies at least because the disclosed blockchain-based systems and methods improve security by using digital tokens to authenticate users in a computer network. That is, security may be improved by use of on-chain digital assets (e.g. digital tokens) to authenticate users. The digital tokens may be used to authenticate or provide access to a user, where the digital tokens are themselves are protected by the blockchain-based platform. The immutability of ownership of the digital token as recorded in the blockchain prevents tampering of the user's identity. Moreover, the digital token, as affiliated with a user, can serve as an indication of the user's authenticating or identification when accessing resources on a computer network, third party platform, or otherwise online, or via a display screen, thereby providing a unique and secure digital security mechanism on a user-to-token basis.

In addition, the present disclosure includes specific features other than what is well-understood, routine, conventional activity in the field, or adding unconventional steps that confine the claim to a particular useful application, e.g., blockchain-based systems and methods for providing secure digital identities and affiliations for users via digital tokens, as further described herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
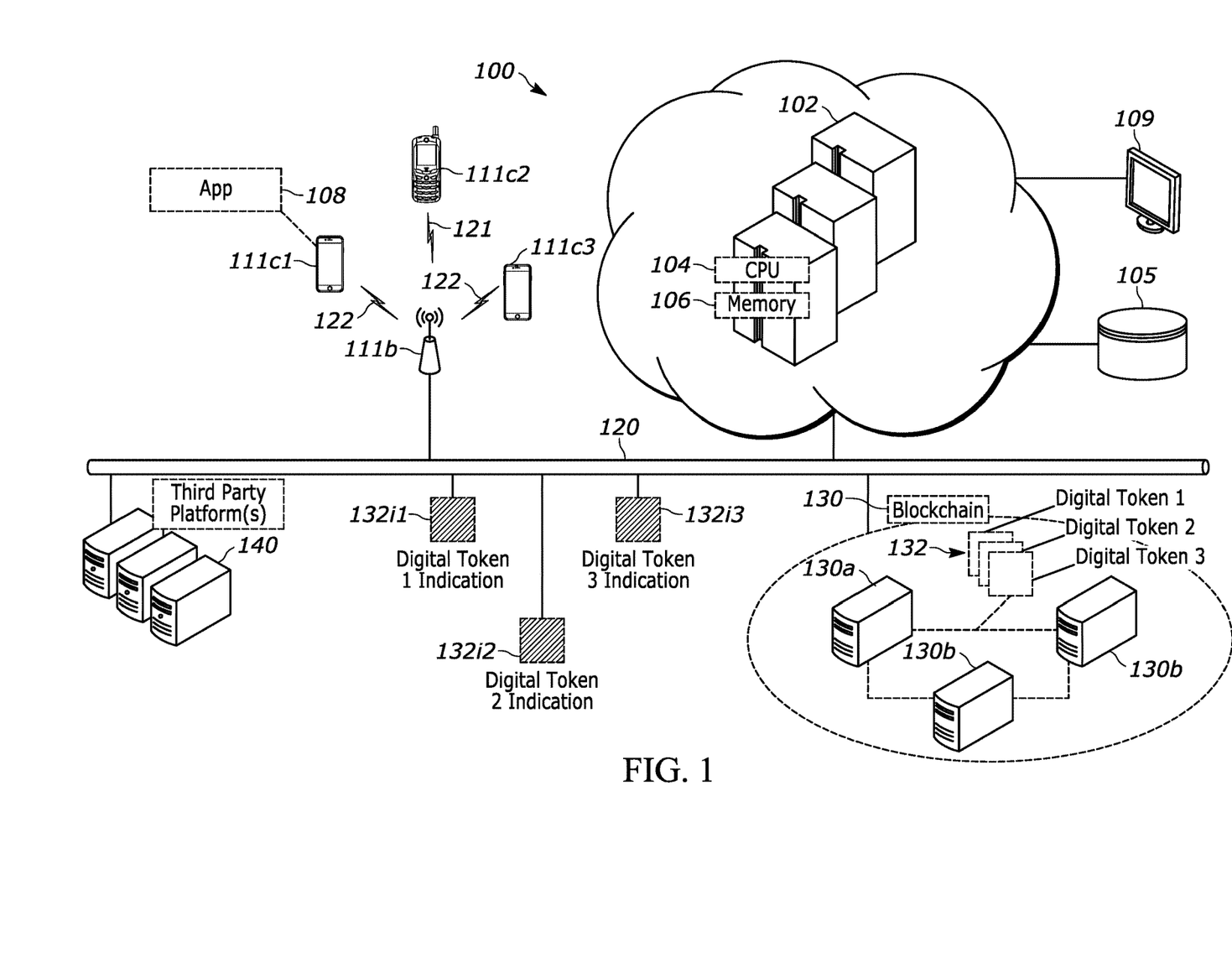
FIG. 1 illustrates an example blockchain-based system configured to provide secure digital identities and affiliations for users via digital tokens, in accordance with various aspects disclosed herein.

FIG. 1 illustrates an example blockchain-based system 100 configured to provide secure digital identities and affiliations for users via digital tokens, in accordance with various aspects disclosed herein. In the example aspect of FIG. 1, blockchain-based system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, server(s) 102 may be any one or more cloud-based platform(s) such as MICROSOFT AZURE, GOOGLE CLOUD, AMAZON AWS, or the like. Server(s) 102 may include one or more processor(s) 104 as well as one or more computer memories 106.

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store computing instructions for implementing any one or more of the blockchain-based method(s) as described herein, including as described herein with respect to FIG. 2. Additionally, or alternatively, off-chain user data (e.g., such as user profile information) or on-chain data or related data (e.g., user digital wallet information such as user public/private keys), digital token(s), and/or related information, or any other data or information, as described herein, may also be stored in memory 106 and/or database 105. Database 105 is accessible or otherwise communicatively coupled to server(s) 102. In addition, memories 106 may also store machine readable instructions, including any of one or more application(s) (e.g., an application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. The computing instructions or applications as described herein may be executed by the processor(s) 104.

The processor(s) 104 may be connected to the memory 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein.

Server(s) 102 may further include a communication component configured to communicate (e.g., send and receive) data via one or more external/network port(s) to one or more networks or local terminals, such as computer network 120 and/or terminal 109 (for rendering or visualizing) described herein. For example, in some aspects, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memory 106 (including the application(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via, or attached to, server(s) 102, or may be indirectly accessible via or attached to terminal 109. According to some aspects, an administrator or operator may access the server 102 via terminal 109 to review information, make changes, establish or configure digital tokens, and/or perform other functions as described herein.

As described herein, in some aspects, server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the e.g., code to allow users to interact with their digital wallets or otherwise with a blockchain) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, server(s) 102 are communicatively connected, via computer network 120 to the one or more user computing devices 111c1-111c3 via base station 111b. In some aspects, base station 111b may comprise one or more cellular base stations, such as cell towers, communicating to the one or more user computing devices 111c1-111c3 via wireless communications 121 based on any one or more of various mobile phone standards, including NMT, GSM, CDMA, UMMTS, LTE, 5G, or the like. Additionally, or alternatively, base station 111b may comprise routers, wireless switches, or other such wireless connection points communicating to the one or more user computing devices 111c1-111c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 may comprise mobile devices and/or client devices for accessing and/or communicating with server(s) 102. Such mobile devices may comprise one or more mobile processor(s) and/or an imaging device for capturing images. In various aspects, user computing devices 111c1-111c3 may comprise a mobile phone (e.g., a cellular phone), a tablet device, a personal data assistance (PDA), or the like, including, by non-limiting example, an APPLE iPhone or iPad device or an ANDROID based mobile phone or tablet.

In various aspects, the one or more user computing devices 111c1-111c3 may implement or execute an operating system (OS) or mobile platform such as APPLE iOS and/or ANDROID operation system. Any of the one or more user computing devices 111c1-111c3 may comprise one or more processors and/or one or more memories for storing, implementing, or executing computing instructions or code, e.g., a mobile application, as described in various aspects herein. As shown in FIG. 1, application (app) 108 and/or an application as described herein, or at least portions thereof, may also be stored locally on a memory of a user computing device (e.g., user computing device 111c1). App 108 may be configured to collect and/or display information regarding user data (e.g., such as user profile information) or off-chain data, (e.g., user digital wallet information such as user public/private keys) or on-chain data (e.g., digital token(s)), and/or other data or information as described herein. App 108 may be configured to perform or execute other actions as described herein, such as communicate with or transmit information and/or data to and from server(s) 102. For example, app 108 may comprise a user's digital wallet used to communicate with blockchain 130, for example, to submit or review transactions related to digital tokens (e.g., digital tokens 1-3 as shown for FIG. 1) as stored on blockchain 130 and/or to send and/or receive indications of affiliation information, association information, and/or ownership information of digital tokens (e.g., digital token indications 1-3 (132i1 to 132i3) as shown for FIG. 1). A user's digital wallet may comprise the user's cryptographic keys, such as the user's private key and public key. The public key may be viewed publically by other users and may be used to identify the user on-chain (e.g., on blockchain 130) and off-chain (e.g., more generally on computer network 120, on server(s) 102, on third party platform(s) 140, and/or on app 108 via computing devices 111c1-111c3). In addition, the user's cryptographic keys each comprise a string of data that identifies the user and provides access to the user's digital wallet. The user's private key and public key provide the user with a secure digital identity on the blockchain 130 that may be used to authenticate the user via digital signatures and make transactions, such as trading digital tokens (e.g., any one or more of digital tokens 1-3) on the blockchain 130.

User computing devices 111c1-111c3 may each comprise a wireless transceiver to receive and transmit wireless communications 121 and/or 122 to and from base station 111b. In various aspects, indication(s) of association or affiliations of digital tokens of may be transmitted via computer network 120 to user computing devices 111c1-111c3 and/or third party platform(s) 140 for distribution, sharing, authentication, granting access, provision, or as otherwise described herein. For example, one or more of digital token 1 identification 121, digital token 2 identification 122, and/or digital token 1 identification 123 may be transmitted between or among user computing devices 111c1-111c3, third party platform(s) 140, server(s) 102, and/or blockchain 130 for authentication, identification, or other purposes as described herein.

Blockchain 130 comprises a blockchain-based software platform that allows generation, storage, recordation, transaction, and/or otherwise manipulation of digital assets, such as digital tokens. Blockchain 130 may implement one or more blockchain-based software algorithms, standards, or protocols which can comprise, for example the ETHEREUM standard (e.g., ERC-20). Blockchain 130 may comprise various computing nodes, such as computing nodes 130a, 130b, and 130c. Computing nodes 130a-130c comprise individual computers or computing platforms configured to validate or authorize blockchain transactions, in a series of blocks, stored on-chain, that is, on blockchain 130. Blockchain 130 may store, or otherwise record, transactions that reference a set digital tokens, e.g., set of digital tokens 132 comprising at least digital token 1, digital token 2, and digital token 3 as illustrated for FIG. 1. Each of digital token 1, digital token 2, and/or digital token 3 may comprise fungible tokens and/or non-fungible tokens. Each of digital token 1 identification 121, digital token 2 identification 122, and digital token 1 identification 123 correspond to digital token 1, digital token 2, and digital token 3, respectively, as stored on blockchain 130. That is, the digital token 1 identification 121, digital token 2 identification 122, and digital token 1 identification 123 are network based identifications, which can be transmitted on computer network 120, to identify or indicate affiliation, association, or ownership of digital token 1, digital token 2, and/or digital token 3, respectively. It is to be understood that while set of digital tokens 132 illustrate a set of three tokens, the set of digital tokens 132 may comprise millions of digital tokens as part of blockchain 130.

Third party platform(s) 140 may comprise server(s) or computing platforms associated with an entity or person. For example, in one example, third party platform(s) 140 may correspond to server(s) or a computing platform associated with an entity such as a sports team, a company, merchandiser, or other such entity. As another example, third party platform(s) 140 may correspond to server(s) or a computing platform associated with a person such as a musician, actor, star, influencer, or other such individual. Third party platform(s) 140 may comprise one or more processors, that receive requests and send information on computer network 120. In various aspects, third party platform(s) 140 accept digital token identification (e.g., digital token 1 identification 121, digital token 2 identification 122, and digital token 1 identification 123) to identify a user based on the user's associated or owned digital tokens (e.g., digital tokens 1-3 of blockchain 130).

Figure 2:
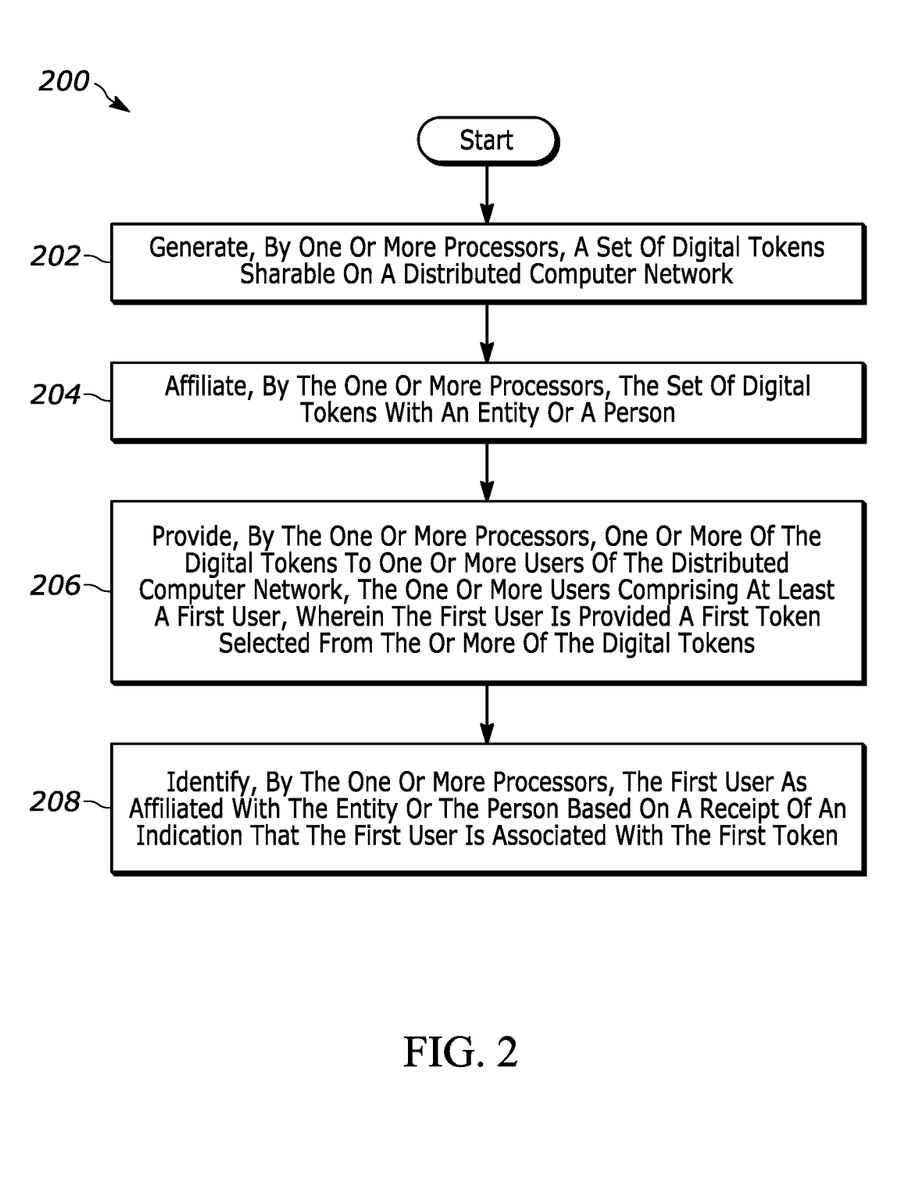
FIG. 2 illustrates an example blockchain-based method for providing secure digital identities and affiliations for users via digital tokens, in accordance with various aspects disclosed herein.

FIG. 2 illustrates an example blockchain-based method 200 for providing secure digital identities and affiliations for users via digital tokens (e.g., any one or more of digital tokens 1-3 of set of digital tokens 132), in accordance with various aspects disclosed herein. At block 202, method 200 comprises generating, by one or more processors, a set of digital tokens (e.g., set of digital tokens 132) sharable on a distributed computer network (e.g., blockchain 130). The one or more processors, as used to generate or otherwise establish the digital tokens, may comprise, by way of non-limiting example, one or more processors of an off-chain server (e.g., CPU 104 of server(s) 102), one or more processors of an on-chain network (e.g., processors of computing node(s) 130a-130c), and/or off-chain computers (e.g., server(s) 102) in conjunction with a distributed network computers (e.g., processors of computing node(s) 130a-130c). For example, the off-chain server (e.g., server(s) 102) may generate the set of tokens 132 by submitting a request to blockchain 130 to create or otherwise establish digital tokens 1-3. Digital tokens 1-3 may comprise fungible tokens or non-fungible tokens (NFTs). Digital tokens may be traded on blockchain 130 among users. In this way, digital tokens may increase and/or decrease in value.

In some aspects, blockchain 130 comprises an ETHEREUM-based platform or blockchain. In such aspects, digital tokens 1-3 of set of tokens 132 may comprise ERC-20 standard-based tokens. Such tokens may comprise smart contracts, which include executable computing code or instructions, or software that execute when predetermined conditions are met. For example, a smart contract, as part of a digital token, may be executed for facilitating transactions or other interactions between users of the digital tokens. For digital tokens based on the ERC-20 standard, rules are established regarding how tokens can be transferred, how transactions are approved, how users can access data about a token, and the total supply of tokens. For example, ERC-20 defines six different implementation coding functions for the benefit of other tokens within the Ethereum system. In terms of implementation coding for ERC-20 tokens, the six basic coding functions comprise: total supply, balance, allowance, approval, transfer, and transfer from. Such coding functions may be used to define the smart contract aspects of a given token (e.g., digital tokens 1-3).

In is to be understood, however, that an ETHEREUM-based platform is but one example of a distributed computer network, and that other blockchain-based networks or distributed systems, based on different standards, may be used in accordance with the disclosure herein.

Figure 3A:
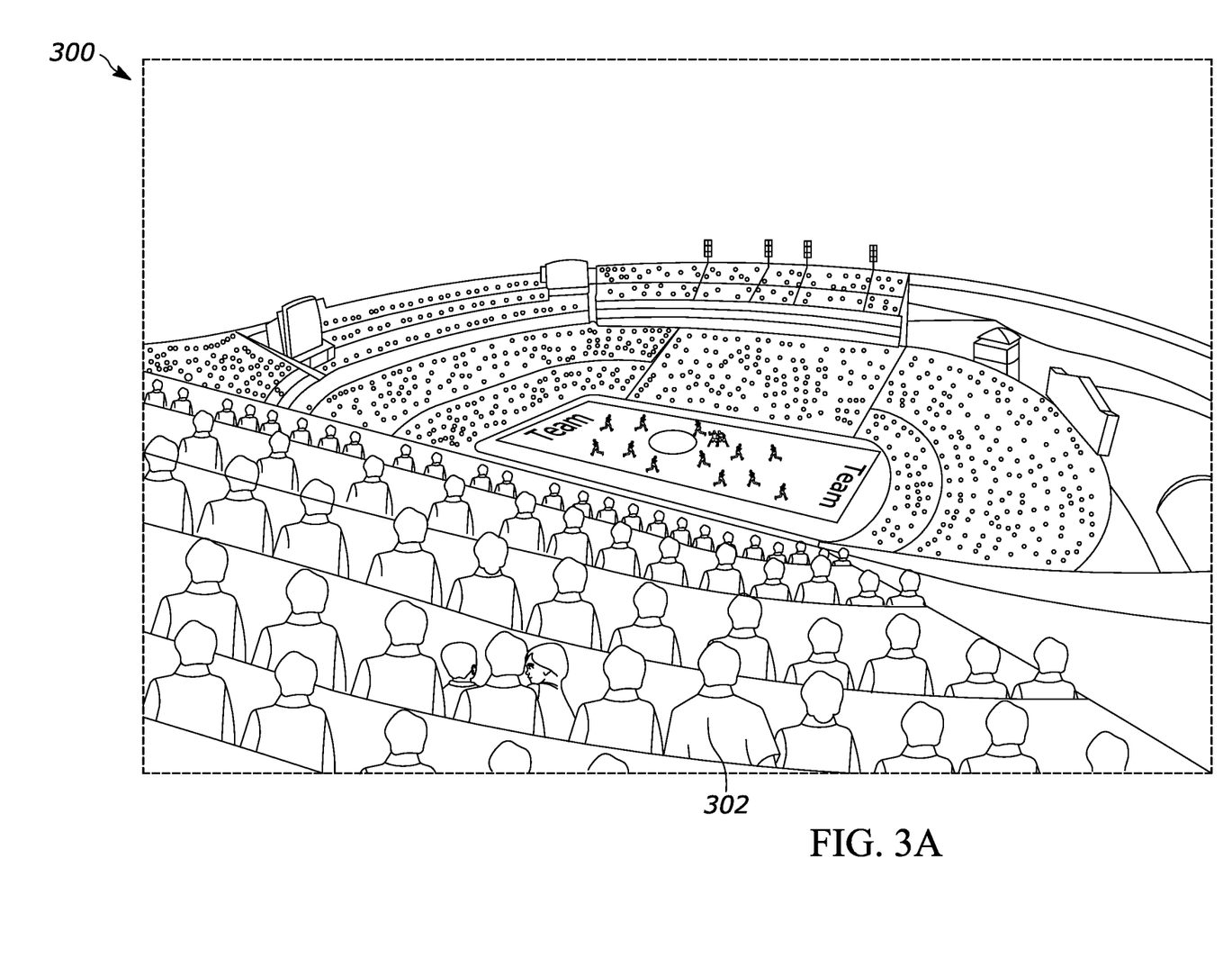
FIG. 3A illustrates an example entity and a related event to which the first user has access to through acquisition of a digital token, in accordance with various aspects disclosed herein.
Figure 3B:
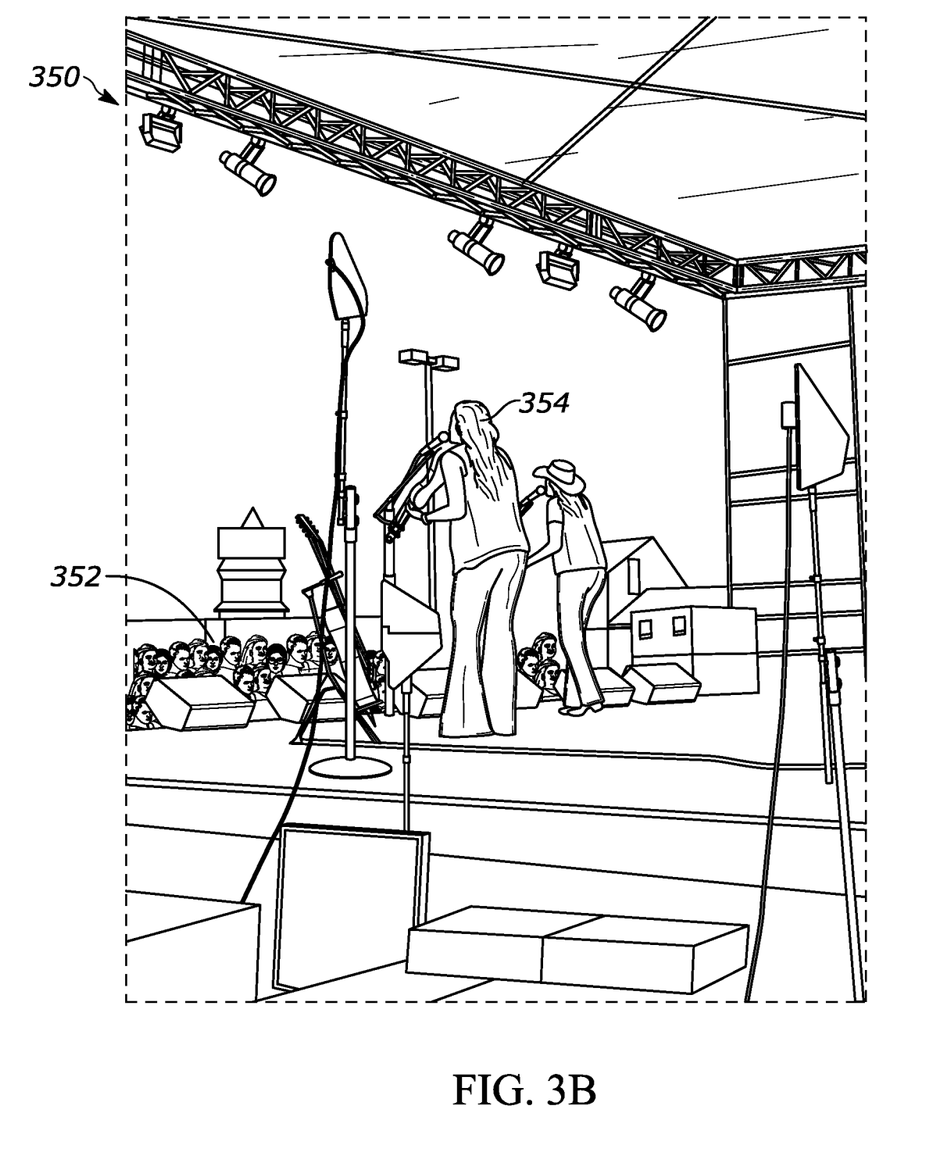
FIG. 3B illustrates an example person and a related event to which the first user has access to through acquisition of a digital token, in accordance with various aspects disclosed herein.

At block 204, method 200 comprises affiliating, by the one or more processors, the set of digital tokens (e.g., set of digital tokens 132) with an entity (e.g., such as a person or a company). In some examples, the entity or the person may comprise a real-world entity or a real-world person. For example, the real-world entity may be a sports team and a real-world person may comprise a musical artist. In other examples, the entity or the person may comprise a virtual entity or a virtual person. For example, the virtual entity or a virtual person may comprise a fictional character of the Metaverse, a video game character, or an online personality. In other aspects, the virtual entity or a virtual person may comprise a non-fictional or quasi-fictional avatar or character associated with a real-world person or entity. By way of non-limiting examples, each of FIGS. 3A and 3B illustrate examples of entities or persons affiliated with the set of digital tokens 132.

At block 206, method 200 comprises providing, by the one or more processors, one or more of the digital tokens (e.g., one or more of digital tokens 1-3 of set of digital tokens 132) to one or more users of the distributed computer network (e.g., blockchain 130). The one or more users may comprise at least a first user. The first user may be provided a first token (e.g., digital token 1) as selected from the one or more of the digital tokens (e.g., set of digital tokens 132).

At block 208, method 200 comprises identifying, by the one or more processors, the first user as affiliated with the entity or the person based on a receipt of an indication that the first user is associated with the first token. For example, a first user may be associated with a first token (e.g., digital token 1 of set of digital tokens 132). The first user may use his or her association with digital token 1 by transmitting or otherwise providing the digital token 1 indication 132*i*1 on computer network 120 to third party platform(s) 140. For example, a user may show ownership or affiliation of digital token 1 by sending information from his or her digital wallet (e.g., digital token 1 indication 132*i*1) to indicate that he or she owns or is otherwise affiliated with digital token 1. Such indication may comprise signing, with the first user's private or public cryptographic key(s), an electronic message (e.g., which may comprise digital token 1 indication 132*i*1) to indicate the first user's ownership of affiliation with digital token 1.

More generally, by using app 108, as executing on a user computing device (e.g., computing device 111*c*1), may be used by a user (e.g., the first user) to access, trade, or otherwise interact with digital tokens 1-3. For example, the first user may access app 108 that stores or has access to the user's digital wallet, which in turn may store or list the user's digital tokens, cryptographic keys (e.g., public and/or private keys), and account information. The user's digital wallet may be stored locally (e.g., on user computing device 111*c*1) and/or remotely (e.g., stored in memory 106 of server(s) 102). The user may use a GUI rendered by app 104 to interact with his or her digital wallet, such as by performing actions as described herein, including, for example, actions identifying or otherwise demonstrating affiliation, association, ownership, or relationship to one or more digital tokens (e.g., any one or more of set of digital tokens 132). The one or more digital tokens may be configured to perform actions, such as execute code or computing instructions, e.g., as part of a smart contract, in order to grant access, authorize transactions, digitally sign, and/or perform other activities, including any as described herein.

For example, in some aspects, a digital token (e.g., a first token such as digital token 1 of set of digital tokens 132) may be configured to grant access to a physical area or location associated with the entity or the person. This may comprise a backstage area or backstage pass of a concert event for a given musical artist as exemplified herein for FIG. 3B. In such aspects, an indication (e.g., digital token 1 indication 132*i*1) of affiliation of the first user with the first token may be shown (e.g., via a display screen of user computing device 111*c*1) or provided digitally to grant access to a physical area or location.

As a further example, a digital token (e.g., a first token such as digital token 1 of set of digital tokens 132) may be configured to grant access to a virtual area or a virtual resource associated with the entity or the person. For example, an indication (e.g., digital token 1 indication 132*i*1) of affiliation of the first user with the first token may be provided digitally to grant access to the virtual area or virtual resource, which may comprise a website, Metaverse location or resource, or other virtual asset associated with the entity or person. In some aspects, the digital token identification may act as, or take the place of, a password as used for security access to the virtual asset or other asset.

As a further example, a digital token (e.g., a first token such as digital token 1 of set of digital tokens 132) may be configured to authorize a discount associated with the entity or the person. For example, an indication (e.g., digital token 1 indication 132*i*1) of affiliation of the first user with the first token may be provided digitally to provide discount on merchandise, such as fan merchandise of pop singer or of sports team, e.g., as exemplified herein for FIG. 3A.

As a still further example, a digital token (e.g., a first token such as digital token 1 of set of digital tokens 132) may be configured to provide a digital signature for the first user. The digital signature may be provided via the digital token and/or first user's private and/or public keys associated with the first user's digital wallet. The digital signature may be used to identify the user on the computer network 120, blockchain 130, to third party platform(s) 140, or otherwise, and show that the first user is affiliated with the first token.

As a still further example, a digital token, (e.g., a first token such as digital token 1 of set of digital tokens 132) may be configured to provide regulatory compliance through identification of the first user. For example, an indication (e.g., digital token 1 indication 132*i*1) of demonstration of affiliation of the first user with the first token, may be provided to authenticate or otherwise show authenticity of the first user for regulatory purposes. This may comprise, for example, for use with security trading. In such aspects, regulatory compliance, such as KYC (know your customer) and AML (anti-money laundering), may be facilitated by using the first digital token to ensure that the first user is who the first user says he or she is, and to demonstrate no or low risk to the related entity or person who receives the indication (e.g., digital token 1 indication 132*i*1) of affiliation of the first token with the first user. In such aspects, the indication (e.g., digital token 1 indication 132i1) may include the user's public/private keys that can be used (e.g., via a digital signature or smart contract execution) to confirm the user's identity to a security trading platform.

FIG. 3A illustrates an example entity (e.g., a sports team) and a related event 300 (e.g., a sporting event) to which the first user has access to through acquisition of a digital token (e.g., digital token 1), in accordance with various aspects disclosed herein. For example, as shown for FIG. 3A, a first user 302 is a fan of a given sports team holding a sporting event 300, e.g., a football game. First user 302 may have a received a discount on tickets to the sporting event 300 and/or related merchandise (e.g., a hat or jersey of the sports team) by virtue of ownership or affiliation of one or more of the set of digital tokens 132, such as a digital token 1. For example, a digital token, (e.g., a first token such as digital token 1 of set of digital tokens 132) may be configured to authorize a discount associated with the entity (e.g., the sports team). In such aspects, an indication (e.g., digital token 1 indication 132i1) of affiliation of the first user 302 with the first token (e.g., digital token 1) may be displayed (e.g., such as displayed via user computing device 111c1 onsite at sporting event 300) or provided digitally to provide discount on tickets or merchandise, such as fan merchandise of the sports team.

FIG. 3B illustrates an example person (e.g., musical artist 354) and a related event (e.g., a concert event 350) to which the first user (e.g., first user 352) has access to through acquisition of a digital token (e.g., digital token 1), in accordance with various aspects disclosed herein. For example, as shown for FIG. 3B, a first user 352 is a fan of a given musical artist 354 holding an event 350, e.g., a concert. First user 352 may have a discount on tickets to the event 350 and/or related merchandise (e.g., an album or merchandise of the musical artist) by virtue of ownership or affiliation of one or more of the set of digital tokens 132, such as a digital token 1. In addition, a digital token, (e.g., a first token such as digital token 1 of set of digital tokens 132) may be configured to grant access to a physical area or location associated with the entity or the person. This may comprise a backstage area or backstage pass of concert event 300 of musical artist 354. For example, a digital token (e.g., a first token such as digital token 1 of set of digital tokens 132) may be configured to authorize a discount associated with the person (e.g., musical artist 354). As a further example, an indication (e.g., digital token 1 indication 132i1) of affiliation of the first user 302 with the first token (e.g., digital token 1) may be displayed (e.g., such as displayed via user computing device 111c1 onsite at concert event 350) or provided digitally to provide discount on merchandise or grant access to a backstage area of the of the concert event 352.

Figure 4:
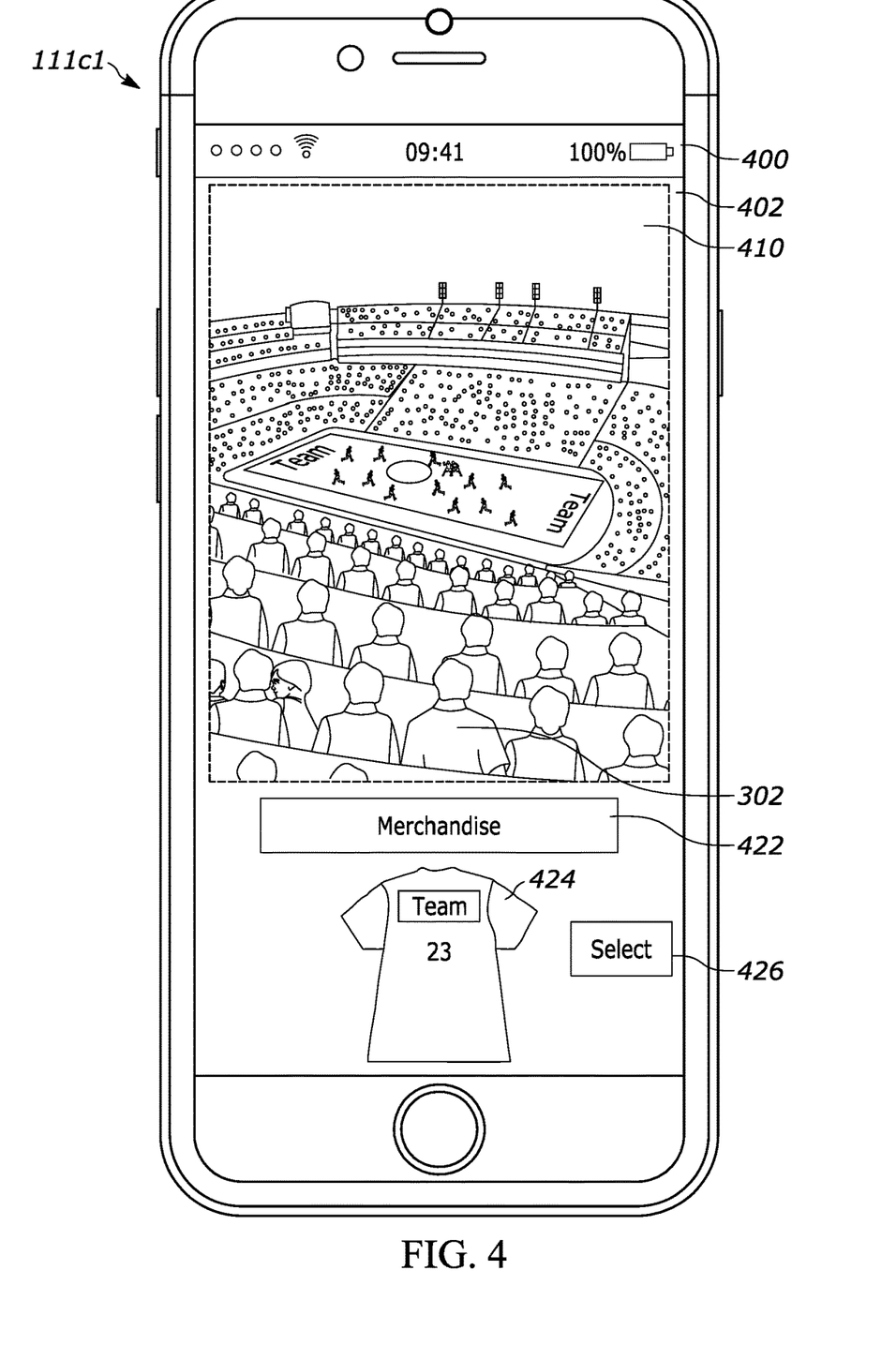
FIG. 4 illustrates an example graphic user interface as rendered on a display screen of a user computing device, in accordance with various aspects disclosed herein.

FIG. 4 illustrates an example graphic user interface (GUI) 402 as rendered on a display screen 400 of a user computing device (e.g., user computing device 111c1), in accordance with various aspects disclosed herein. GUI 402 is an example depicting a rendering of what a first user 302 may experience for sporting event 302 as described for FIG. 3A herein. For example, as shown in the example of FIG. 4, GUI 402 may be implemented or rendered via an app executing on user computing device 111c1. GUI 402 may be implemented or rendered via a native app executing on user computing device 111c1. In the example of FIG. 4, user computing device 111c1 is a user computer device as described for FIG. 1, e.g., where 111c1 is illustrated as an APPLE IPHONE that implements the APPLE iOS operating system and that has display screen 400. User computing device 111c1 may execute one or more native applications (apps) on its operating system, including, for example, an app (e.g., app 108) as described herein. Such native apps may be implemented or coded (e.g., as computing instructions) in a computing language (e.g., SWIFT) executable by the user computing device operating system (e.g., APPLE iOS) by the processor of user computing device 111c1. In various aspects, app 108 may be configured to display content to the user, including information associated with entities, persons, events and/or other information, data, or images as described herein.

Additionally, or alternatively, GUI 402 may be implemented or rendered via a web interface, such as via a web browser application, e.g., SAFARI and/or CHROME based web browsers, browser apps, and/or other such web browser or the like. In such aspects, the web browser would return HTML code provided by, or otherwise associated with, the server(s) 102.

By using app 108, as executing on user computing device(s) 111c1-111c3, a user (e.g., the first user) may access, trade, sell, buy, or otherwise interact with digital tokens 1-3. For example, the first user may access app 108 that stores or has access to the user's digital wallet. The digital wallet may store or list the user's digital tokens, cryptographic keys (e.g., public and/or private keys), account information, or other information related to the user. The user's digital wallet may be stored locally (e.g., on user computing device 111c1) and/or remotely (e.g., stored in memory 106 of server(s) 102). The user may use a GUI rendered by app 104 to interact with his or her digital wallet, such as by performing actions as described herein, including, for example, actions identifying or demonstrating affiliation, association, ownership, or relationship to one or more digital tokens (e.g., any one or more of set of digital tokens 132). The one or more digital tokens may be configured to perform actions, such as execute code or computing instructions, e.g., as part of a smart contract, in order to grant access, authorize transactions, digitally sign, and/or perform other activities.

In the example of FIG. 4, GUI 402 depicts a graphic 410 to graphically indicate that the app 108 is displaying information associated with sporting event 300 as described for FIG. 3A. First user 302 may interact with app 108 to purchase merchandise 422. Such merchandise may include a sports jersey that the user 302 may select for purchase and/or shipment via a section option 426. The purchase may comprise app 108 transmitting or otherwise providing the digital token 1 indication 132i1 to identify the first user as affiliated with the entity (e.g., the sports team), where receipt of the indication identifies or confirms that the first user is associated with the first token, and, therefore, the related entity (e.g., sports team).

In additional aspects, digital tokens may be exchanged with the entity and/or other users. For example, in some aspects, the first token may be configured to be provided to the entity in exchange for a real-world item. As an additional example, in some aspects, the first token may be configured for electronic trading for one or more other tokens as provided to other users. In such aspects, a first value of the first token may vary with respect to respective values of the one or more other tokens based on a degree of privilege or access to the entity that each token provides. As a specific example, a company (e.g., a bakery) that sells digital tokens representing its goods (e.g., such as cookies) can be redeemed for actual cookies or traded with other users where the values, as bound to items of the entity, vary across digital tokens (e.g., 3 cookies for 1 muffin, where the digital tokens are tied to baked goods originating from, or otherwise associated with, the entity).

In further aspects, digital tokens may represent shares or membership of the entity. For example, in such aspects, a first token may define a fractional share of the entity, and the blockchain-based method (e.g., method 200 as described herein) may further comprise providing the first user with a fractional distribution or privilege proportional to the fractional share of the entity. In this way, the digital tokens (including the first token) may be used by the entity to raise capital. For example, the entity could sell digital tokens as shares that are redeemable for a corresponding fractional percentage of net profits of the entity, net losses of the entity, ownership of the entity, control of the entity, and/or the like.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A blockchain-based method for providing secure digital identities and affiliations for users via digital tokens, the blockchain-based method comprising:

generating, by one or more processors, a set of digital tokens sharable on a distributed computer network;

affiliating, by the one or more processors, the set of digital tokens with an entity, wherein the entity comprises a person or a company, wherein the affiliating establishes and maintains an affiliation of the set of digital tokens as originating with the person or company on the distributed computer network even when ownership of one or more of the digital tokens of the set of digital tokens is transferred to one or more users of the distributed computer network;

providing, by the one or more processors, the one or more of the digital tokens to the one or more users of the distributed computer network, the one or more users comprising at least a first user, wherein the first user is provided a first token selected from the one or more of the digital tokens;

prior to (a) authorizing a transaction between the first user and the entity or (b) granting access to the first user for a resource or area controlled by the entity, executing a confirmation that the first user has affiliation with the entity by virtue of maintaining ownership of the first token by the first user on the distributed computer network, the confirmation comprising identifying, by the one or more processors, the first user as affiliated with the entity following a receipt of an indication that the first user owns the first token and that the entity has the affiliation with the first user by virtue of the first user's ownership of the first token selected as originally provided from one or more of the digital tokens of the set of digital tokens, wherein the identifying confirms that the first user maintains association with the entity; and following the confirmation, executing at least one of: (a) authorizing the transaction between the first user and the entity, or (b) granting access to the first user for a resource or area controlled by the entity, wherein the first user owns and is affiliated with the first token.

2. The blockchain-based method of claim 1, wherein the entity or the person is a real-world entity or a real-world person.

3. The blockchain-based method of claim 1, wherein the entity or the person is a virtual entity or a virtual person.

4. The blockchain-based method of claim 1, wherein the first token is configured to grant access to a physical area or location associated with the entity or the person.

5. The blockchain-based method of claim 1, wherein the first token is configured to grant access to a virtual area or a virtual resource associated with the entity or the person.

6. The blockchain-based method of claim 1, wherein the first token is configured to authorize a discount associated with the entity or the person.

7. The blockchain-based method of claim 1, wherein the first token is configured to provide a digital signature for the first user.

8. The blockchain-based method of claim 1, wherein the first token is configured to provide regulatory compliance through identification of the first user.

9. The blockchain-based method of claim 1, wherein the first token is configured to be provided to the entity in exchange for a real-world item.

10. The blockchain-based method of claim 1, wherein the first token is configured for electronic trading for one or more other tokens as provided to other users, and wherein a first value of the first token varies with respect to respective values of the one or more other tokens based on a degree of privilege or access to the entity that each token provides.

11. The blockchain-based method of claim 1, wherein the first token defines a fractional share of the entity, and wherein the blockchain-based method further comprises providing the first user with a fractional distribution or privilege proportional to the fractional share of the entity.

12. A blockchain-based system configured to provide secure digital identities and affiliations for users via digital tokens, the blockchain-based system comprising:
one or more processors;
one or more memories;
computing instructions configured to be executed on the one or more processors, the computing instructions, when executed by one or more processors, cause the one or more processors to:
generate a set of digital tokens sharable on a distributed computer network,
affiliate the set of digital tokens with an entity, wherein the entity comprises a person or a company, wherein the affiliating establishes and maintains an affiliation of the set of digital tokens as originating with the person or company on the distributed computer network even when ownership of one or more of the digital tokens of the set of digital tokens is transferred to one or more users of the distributed computer network,
provide one or more of the digital tokens to one or more users of the distributed computer network, the one or more users comprising at least a first user, wherein the first user is provided a first token selected from the one or more of the digital tokens, and
prior to (a) authorizing a transaction between the user and the entity or (b) granting access to the first user for a resource or area controlled by the first entity, execute a conformation that the first user has affiliation with the entity by virtue of maintaining ownership of the first token by the first user on the distributed computer network, the confirmation comprising identifying, by the one or more processors, the first user as affiliated with the entity following a receipt of an indication that the first user owns the first token and that the entity has the affiliation with the first user by virtue of the first user's ownership of the first token selected as originally provided from one or more of the digital tokens of the set of digital tokens, wherein the identifying confirms that the first user maintains association with the entity; and
following the confirmation, execute at least one of: (a) authorizing the transaction between the first user and the entity, or (b) granting access to the first user for a resource or area controlled by the entity, wherein the first user owns and is affiliated with the first token.

13. The blockchain-based system of claim 12, wherein the entity or the person is a real-world entity or a real-world person.

14. The blockchain-based system of claim 12, wherein the entity or the person is a virtual entity or a virtual person.

15. The blockchain-based system of claim 12, wherein the first token is configured to grant access to a physical area or location associated with the entity or the person.

16. The blockchain-based system of claim 12, wherein the first token is configured to grant access to a virtual area or a virtual resource associated with the entity or the person.

17. The blockchain-based system of claim 12, wherein the first token is configured to authorize a discount associated with the entity or the person.

18. The blockchain-based system of claim 12, wherein the first token is configured to provide a digital signature for the first user.

19. The blockchain-based system of claim 12, wherein the first token is configured to provide regulatory compliance through identification of the first user.

20. The blockchain-based system of claim 12, wherein the first token is configured to be provided to the entity in exchange for a real-world item.

21. The blockchain-based system of claim 12, wherein the first token is configured for electronic trading for one or more other tokens as provided to other users, and wherein a first value of the first token varies with respect to respective values of the one or more other tokens based on a degree of privilege or access to the entity that each token provides.

22. The blockchain-based system of claim 12, wherein the first token defines a fractional share of the entity, and wherein the computing instructions, when executed by one or more processors, further cause the one or more processors to provide the first user with a fractional distribution or privilege proportional to the fractional share of the entity.

23. A tangible, non-transitory computer-readable medium storing instructions for providing secure digital identities and affiliations for users via digital tokens, that when executed by one or more processors cause the one or more processors to:

generate a set of digital tokens sharable on a distributed computer network;

affiliate the set of digital tokens with an entity, wherein the entity comprises a person or a company, wherein the affiliating establishes and maintains an affiliation of the set of digital tokens as originating with the person or company on the distributed computer network even when ownership of one or more of the digital tokens of the set of digital tokens is transferred to one or more users of the distributed computer network;

provide one or more of the digital tokens to one or more users of the distributed computer network, the one or more users comprising at least a first user, wherein the first user is provided a first token selected from the one or more of the digital tokens; and prior to (a) authorizing a transaction between the user and the entity or (b) granting access to the first user for a resource or area controlled by the first entity, execute a conformation that the first user has affiliation with the entity by virtue of maintaining ownership of the first token by the first user on the distributed computer network, the confirmation comprising identifying, by the one or more processors, the first user as affiliated with the entity following a receipt of an indication that the first user owns the first token and that the entity has the affiliation with the first user by virtue of the first user's ownership of the first token selected as originally provided from one or more of the digital tokens of the set of digital tokens, wherein the identifying confirms that the first user maintains association with the entity; and following the confirmation, execute at least one of: (a) authorizing the transaction between the first user and the entity, or (b) granting access to the first user for a resource or area controlled by the entity, wherein the first user owns and is affiliated with the first token.

24. The blockchain-based method of claim 1, wherein the one or more users comprises another user, and wherein the blockchain-based method further comprises: transfer of the first token to the another user, and identifying, by the one or more processors, the another user as affiliated with the entity based on a receipt of an indication that the another user owns the first token and that the entity has the affiliation with first token selected from one or more of the digital tokens of the set of digital tokens, wherein the identifying confirms that the another user is associated with the entity.

* * * * *

UNITED STATES PATENT AND TRADEMARK OFFICE
CERTIFICATE OF CORRECTION

| | | |
|---|---|---|
| PATENT NO. | : 12,212,695 B2 | Page 1 of 1 |
| APPLICATION NO. | : 17/748591 | |
| DATED | : January 28, 2025 | |
| INVENTOR(S) | : Glenton Davis et al. | |

It is certified that error appears in the above-identified patent and that said Letters Patent is hereby corrected as shown below:

In the Claims

At Column 16, Line 9, "tokens, and" should be -- tokens, --.

At Column 16, Line 26, "entity; and" should be -- entity, and --.

At Column 17, Line 20, "tokens; and" should be -- tokens; --.

Signed and Sealed this
Tenth Day of June, 2025

Coke Morgan Stewart
*Acting Director of the United States Patent and Trademark Office*